(12) United States Patent
Motamedi et al.

(10) Patent No.: US 7,262,265 B1
(45) Date of Patent: Aug. 28, 2007

(54) HIGH TEMPERATURE THERMOSET COMPOSITIONS

(75) Inventors: Farshad J. Motamedi, Claremont, CA (US); Matthew L. Marrocco, III, Fontana, CA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 311 days.

(21) Appl. No.: 10/779,207

(22) Filed: Feb. 13, 2004

(51) Int. Cl.
*C08G 75/20* (2006.01)
*C08G 79/02* (2006.01)

(52) U.S. Cl. .................. 528/391; 528/373; 528/397; 528/398; 528/171; 528/167; 528/169; 528/174

(58) Field of Classification Search ............... 528/391, 528/373, 397, 171, 167, 169, 174, 398
See application file for complete search history.

(56) References Cited

U.S. PATENT DOCUMENTS

| | | | |
|---|---|---|---|
| 3,784,504 A | 1/1974 | Feasey | |
| 4,587,312 A | 5/1986 | Hergenrother et al. | |
| 4,731,442 A | 3/1988 | Lindley et al. | |
| 4,745,224 A * | 5/1988 | Knebel et al. | ............... 568/14 |
| 4,806,601 A | 2/1989 | Percec | |
| 5,021,518 A | 6/1991 | Hergenrother et al. | |
| 5,179,193 A * | 1/1993 | Bobsein et al. | ............. 528/388 |
| 5,493,002 A | 2/1996 | McGrath et al. | |
| 6,087,467 A | 7/2000 | Marrocco, III et al. | |
| 6,191,252 B1 | 2/2001 | Jensen | |

OTHER PUBLICATIONS

Ayambem et al., "Endgroup Substituent Effect on the Rate/Extent of Network Formation and Adhesion for Phenyethynyl-Terminated Poly(Arylene Ether Sulfone) Oligomers)", Polymer, 2000, vol. 41, pp. 5109-5124.
Liu et al., "Studies on dynamic Mechanical Behaviors of Controllable Cross-Linking Poly(Ether Ether Ketone);", Polymer Preprints, 2003, vol. 44, No. 2, pp. 413-415.
Liu et al., "Properties of Controllable Crosslinking Poly (Aryl Ether Ketone)S", Polymer Preprints, 2002, vol. 43, No. 1, p. 456.

* cited by examiner

*Primary Examiner*—Duc Truong
(74) *Attorney, Agent, or Firm*—Christie, Parker & Hale, LLP.

(57) ABSTRACT

A new family of high temperature thermoset resins having high glass transition temperatures and enhanced hygrothermal stability that are synthesized using inexpensive starting materials in essentially a single step process. A trifunctional aromatic, wherein at least one of the three functional groups comprises a halogen and the balance thereof comprises OH groups and wherein said aromatic has electron withdrawing properties, is polymerized using an excess of a diol.

46 Claims, No Drawings

HIGH TEMPERATURE THERMOSET COMPOSITIONS

STATEMENT REGARDING FEDERALLY SPONSORED RESEARCH OR DEVELOPMENT

The U.S. Government has certain rights in this invention pursuant to Contract No. F49620-01-C-0017.

FIELD OF THE INVENTION

The present patent application generally relates to thermoset resins and more particularly pertains to a new family of resin compositions that provide a combination of higher glass transition temperatures, greater hygrothermal stability and a reduction in manufacturing costs relative to presently known materials.

BACKGROUND OF THE INVENTION

High temperature thermoset compositions are useful in many demanding applications including molding resins, composite matrix resins, adhesives, coatings, blends, etc. Significant effort has been expended over the past several decades in the development of such materials whereby several viable resin systems have been identified and adapted for various applications with varying degrees of success. Of initial importance is the facile processability of the resin material prior to curing. Ideally, the material should be readily workable in such state so as to facilitate its molding, compositing or adherence to a surface, etc., as may be required for a particular application. Additionally, the material should remain stable in such state for an extended period of time. Of course, of ultimate importance are the material's properties after curing wherein a high glass transition temperature and the ability to retain certain properties at elevated temperatures for extended periods of time are particularly desirable. Another very important consideration is the cost of production of the resin including both the costs of the starting materials as well as the amount and complexity of the processing that is required.

Several strategies have to date been employed in an effort to achieve such goals. One fairly successful strategy has been to attach thermally activated (cross-linkable) groups to the side or end of thermally stable aromatic polymers (oligomers) such as polysulfones and/or polyimides. Several reactive group candidates have been considered including cyanate, benzocyclobutene, maleimide, ethynyl, phenylethynyl, phenylmaleimide, nadimide, norbornene, etc. The reactive groups can be incorporated either during the polymerization step or attached in a separate step to a preformed polymer. The reactive group will have to withstand the synthetic conditions (e.g., aromatic nucleophilic displacement reactions used to prepare poly(arylene ether)s and cure to give a structure with long term high temperature stability. For example, the high performance PMR family of thermoset resins comprises dialkylester of an aromatic tetracarboxylic acid, an aromatic diamine and a monoalkyl ester of 5-norbornese-2,3-dicarboxylic acid. Another useful high temperature thermoset resin is the LaRC-PETI phenylethynyl terminated imide system developed at NASA Langley research center. The curing of the phenylethynyl end groups results in chain extension and possible cross-linking of the imide structure.

While the continued development of heretofore known resin systems has yielded increases in glass transition temperatures and enhanced stability, such progress has typically amounted to mere incremental enhancements and often requires the use of expensive starting materials and/or complex processing. It is therefore most desirable to provide a new family of high temperature thermosetting resins with which significant increases with regard to glass transition temperature and/or high temperature stability can be realized and which can be manufactured using inexpensive starting materials and simple procedures. Providing a new family of compositions with such advantages would serve to greatly expand the applications for thermosetting resin materials.

SUMMARY OF THE INVENTION

The present invention provides for the synthesis, composition and uses of a new family of polymers capable of undergoing curing reactions the products of which exhibit high softening temperatures and are insoluble in common organic solvents. A high temperature polymer has a glass transition temperature ($T_g$) of preferably greater than 200° C., more preferably greater than 250° C., even more preferably greater than 300° C., and yet more preferably greater than 350° C. The polymers of the present invention may have a Tg above 400° C., 450° C., or even 500° C. depending on the extent of branching and the stiffness of the polymer backbone. The thermosetting compositions are prepared in a single step utilizing mostly commercially available starting materials. Prior to curing, the materials are readily workable so as to facilitate their molding, incorporation in composites or use as adhesives, coatings or blends.

The resin system of the present invention requires the polymerization of a multifunctional aromatic having at least three functional groups or, preferably, the copolymerization thereof with a difunctional aromatic using a diol as a linking agent. By selecting the proportions of each of the components, a stable polymer or copolymer is provided having the desired degree of workability prior to curing and which is subsequently curable into a hygrothermally stable material having a high glass transition temperature.

Central to the resin system of the present invention is the use of a multifunctional aromatic having at least three functional groups wherein the functional groups may comprise a combination of one halogen and two hydroxyl groups, or more preferably, two halogens and one hydroxyl group or most preferably, three halogens. The halogen may comprise Br or I, more preferably F or most preferably Cl. The aromatic is selected so as to have electron withdrawing properties and can thus include, but is not limited to, a sulfone, carbonyl or phosphine oxide. For good reactivity, the functional groups are preferably in the ortho or para positions in the rings relative to the electron withdrawing groups. The most preferred such aromatic is a trifunctional aromatic comprising 2,4,4'-trichlorodiphenylsulfone.

The multifunctional aromatic having at least three functional groups as set forth above is optionally and preferably copolymerized with a difunctional aromatic wherein the functional groups preferably comprise halogens, either Br or I, or more preferably F or most preferably Cl. The aromatic has electron withdrawing properties and can include, but is not limited to a dihalobenzenoid compound. The most preferred difunctional aromatic for compolymerization with 2,4,4'-trichlorodiphenylsulfone comprises 4-chlorophenyl sulfone.

In its most general form the polymers of the current invention are prepared according to the following scheme:

Equation 1:

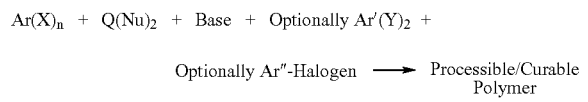

where n is 3 or more, the three or more functional groups X and the two functional groups Y can be the same or different, wherein at least one of the X's and one of the Y's comprises a halogen and the remaining X's and Y's are independently selected from the list of nucleophiles (shown in their protonated form):

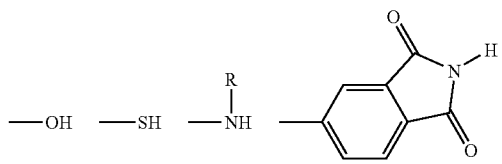

and halogen, the groups —Nu are selected independently from the list of nucleophiles (shown in their protonated form):

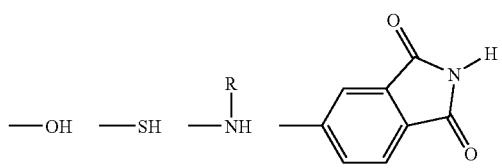

the base is any base strong enough to deprotonate the nucleophile or to accept the acid liberated on reaction. It will be recognized by one skilled in the art that some of the nucleophiles shown do not need to be deprotonated to react with an activated aryl halide (e.g. —NH$_2$) while others do (e.g. —OH, —SH, —NRH where R is alkyl, aryl, alkyl ketone or aryl ketone and phthalimide). The term nucleophile is used herein to refer to both the protonated and deprotonated forms. Q is any divalent moiety and may be aliphatic or aromatic and may contain heteroatoms and additional substituents, for example to aid in solubility or processability.

Non-limiting examples of dinucleophiles Q(Nu)$_2$ used in the practice of the present invention include:

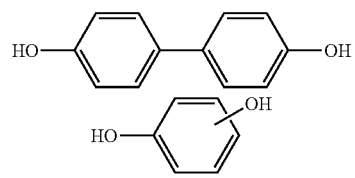

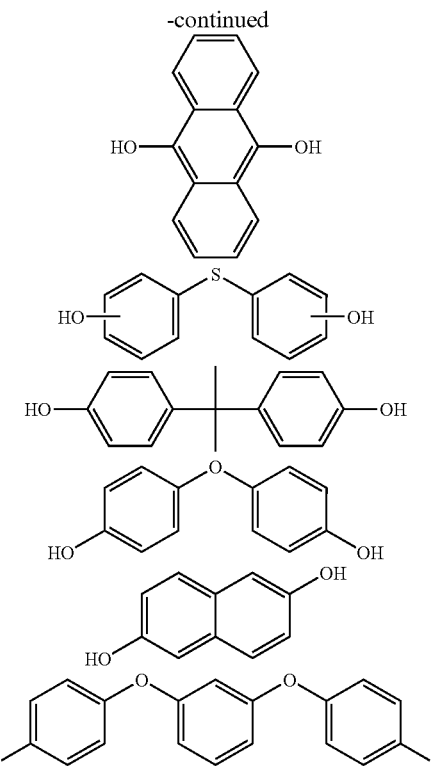

In a preferred embodiment n is 3, all X's and Y's are Cl, both Nu's are —OH, the base is potassium carbonate, Ar is diphenylsulfonetriyl, Ar' is diphenyl sulfonediyl, and Q is biphenylene:

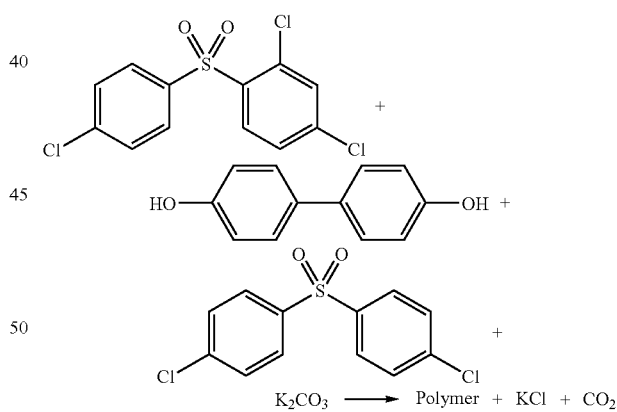

Typically, the dinucleophile and base are allowed to react first, with removal of water as necessary (for example, azeotropic distillation). After this step, the dinucleophile may be monoanion or a dianion (e.g. a double alkali metal salt), depending on the relative strength of the base and first and second pKa's of the dinucleophile. In either case it is preferred to have at least one equivalent of base for each halogen group present so that as the reaction proceeds there is enough base to form the anion of each nucleophile group.

It is preferred that the independently selected functional groups X and Y (Equation 1) consist of halogen or hydroxy groups, where the moles of hydroxy groups may be the same or in excess of the moles of the halogen groups. The excess is preferably about 1 mol %, more preferably 2 mol %, yet more preferably 3 mol %, even more preferably 5 mol %, and most preferably 6-12 mol %. A large excess may be applied as needed to control molecular weight. Optionally, X comprises all halogen groups and Y, all hydroxy groups.

As a further option, a monohalo monomer may be included to control molecular weight.

Ar, Ar', and Ar" are aromatic rings bearing one or more substituents having electron withdrawing properties. Such substituents can include ketone, sulfone, phosphine oxide, sulfoxide, cyano, fluoro, trifluoromethyl, nitro, azo groups and the like. Ar, Ar' and Ar" may be multiring or fused ring groups including heterocyclic rings. Halo is F, Cl, Br, I. R is alkyl, aryl, alkylester, arylester, amide, fluoroalkyl, fluoroaryl, alkylketone or arylketone.

In its most general form Q can be represented as:

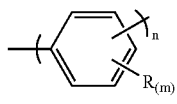 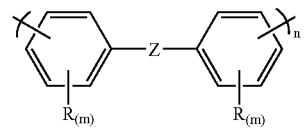

where m is 0 to 4 and the NRm) are independently selected from alkoxy, aryloxy, alkyl, aryl, alkylester, arylester, amide, fluoroalkyl, fluoroaryl, polyalkalene oxy. Any two adjacent $R_{(m)}$ may be bridging to form cyclic or heterocyclic units. Z is independently selected from the group consisting of nil, —O—, —S—, —NR—, and —CR$_1$R$_2$—, and R$_1$ and R$_2$ are independently selected from alkoxy, aryloxy, alkyl, aryl, alkylester, arylester, amide, fluoroalkyl, fluoroaryl, alkylketone, or arylketone.

Non-limiting examples of difunctional groups useful in the practice of the present invention are:

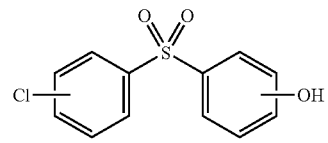

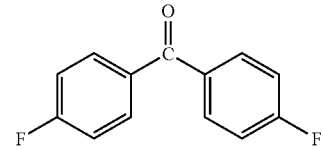

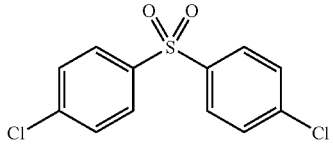

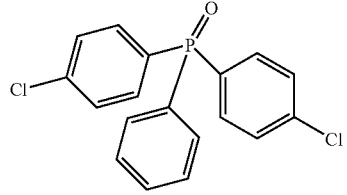

-continued

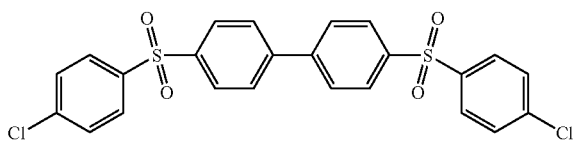

Non-limiting examples of trifunctional groups useful in the practice of the present invention are:

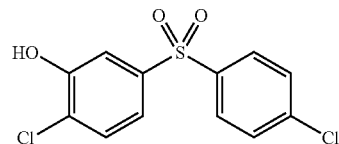

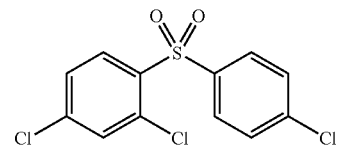

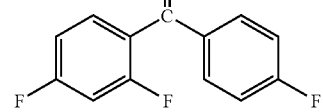

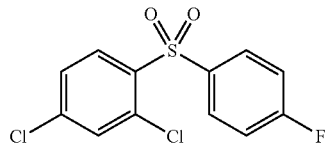

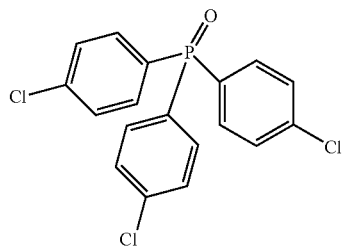

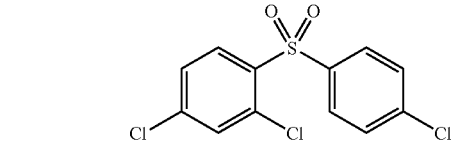

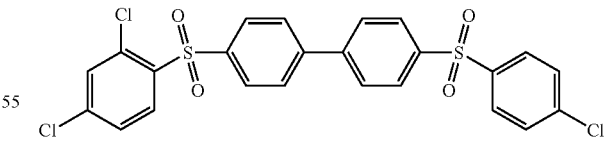

Nonlimiting examples of tetra-halo monomers include:

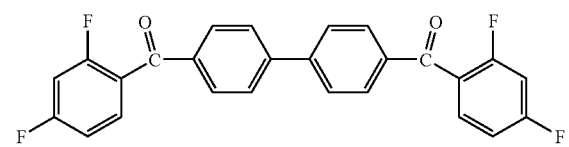

-continued

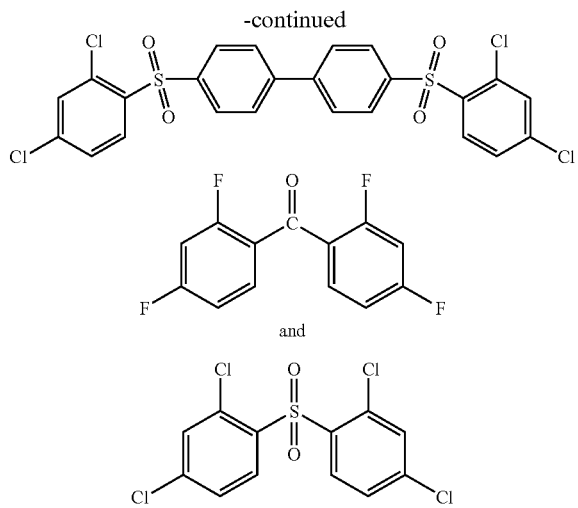

Non-limiting examples of hexa-halo monomers include:

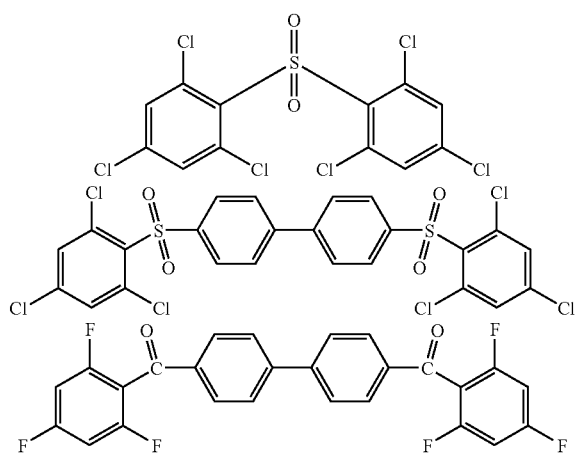

The linking agent (comonomer) preferred for the polymerization of the multifunctional aromatic having at least three functional groups or the copolymerization thereof with the difunctional aromatic is derived from dihydric polynuclear phenols, preferably dihydroxy aromatic compounds. A most preferred linking agent for the polymerization of 2,4,4'-trichlorodiphenysulfone or the copolymerization of 2,4,4'-trichlorodiphenylsulfone with 4-chlorophenyl sulfone is derived from 4,4'-biphenol.

By combining the multifunctional aromatic having at least three functional groups, or its combination with the difunctional aromatic, with an excess of the diol linking agent, the polymerization reaction is controlled so as to limit the molecular weight of the resulting polymer or copolymer and thus preserve the workability of the material prior to curing. An excess is defined in terms of the total number of hydroxyl groups of the linking agent relative to the total number of functional groups in the multi- and difunctional aromatics, wherein the former preferably exceeds the latter, preferably by at least 1% or more preferably, by at least 10%.

Reaction of the diol linking agent with $K_2CO_3$ or $Na_2CO_3$ or an appropriate base as is well known in the art turns the diol into the corresponding double alkali metal salt which allows the polymerization reaction to proceed to completion.

The resulting material is stable, soluble in a variety of organic solvents and workable so as to readily facilitate molding, compositing, its use as an adhesive, coating or blending component. Subsequent curing at an elevated temperature greater than about 250° C., preferably 300° C. or most preferably 340° C. yields a material that has a very high glass transition temperature, that is insoluble in most organic solvents, and that is hygrothermally stable.

These and other features and advantages of the present invention will become apparent from the following detailed description of preferred embodiments which illustrate by way of example principles of the invention.

DETAILED DESCRIPTION OF THE PREFERRED EMBODIMENTS

The following examples all call for the reaction of a multifunctional aromatic having at least three functional groups, wherein at least one of the functional groups is a halogen and the balance is OH, with an excess of a diol to synthesize a high temperature thermosetting resin of the present invention:

EXAMPLE 1

A trifunctional sulfone in the form of 2,4,4'-trichlorodiphenylsulfone is first prepared by a Friedel-Crafts reaction. 4-chlorobenzene sulfonylchloride (2.0 Kg, 9.48 mole) and m-dichlorobenzene (4.50 liter, 39.14 mole) were charged into a 6 liter flask and mixed until a homogeneous solution was obtained. Aluminum chloride (2.5 Kg, 18.96 mole) and m-dichlorobenzene (4.50 liter, 39.14 mole) were charged into a 22 liter flask. While purging with nitrogen and stirring, the contents of the first flask was added to the 22 liter flask over a 4 hour period resulting in minimal temperature rise but the evolution of HCl gas. The reaction was heated to 70° C. and stirred overnight. The heating was stopped and the reaction was quenched with 6 liters of 10% aqueous HCl solution and 3 Kg ice to reduce the temperature. Solid precipitated out which was filtered and washed twice with 4 liter of isopropanol. The product was filtered and dried. Yield: 1,637 g, 53.7%.

3.72 g (26.92 mmol) potassium carbonate was charged into 100 mL of 5:1 NMP:toluene solvent mixture in a 250 mL round bottom flask fitted with a dean stark assembly and azeotroped for 5 hours. 4.90 g (17.06 mmol) of 4-chlorophenyl sulfone and 1.57 g (4.88 mmol) of 2,4,4'-trichlorodiphenyl sulfone and 5.0 g (26.85 mmol) of 4,4'-biphenol were added into the base solution and stirred at reflux at about 185° C. for 16 hours when the reaction mixture was dark and viscous. The resulting mixture was dripped into 9:1 isopropanol:water. The precipitate was washed with isopropanol twice and dried under vacuum at 130° C. The dried powder showed a glass transition temperature of 227° C. Upon heating the powder at 400° C. in air for one hour, the powder exhibited a glass transition temperature of 289° C. and was insoluble in hot NMP.

EXAMPLE 2

0.46 g (3.33 mmol) potassium carbonate and 0.62 g (3.33 mmol) 4,4'-biphenol were charged into 10 mL of 5:1 NMP:toluene solvent mixture in a 25 mL round bottom flask fitted with a dean stark assembly and azeotroped for 5 hours. 0.3 g (1.04 mmol) 4-chlorophenyl sulfone and 0.42 g (1.10 mmol) trichlorophenyl phosphine oxide were added to the reaction mixture and stirred at about 180° C. for 17 hours.

The resulting mixture was dripped into isopropanol. The precipitate was washed with isopropanol twice and dried under vacuum at 130° C. The dried powder showed a glass transition temperature of 217° C. Upon heating the powder at 400° C. in air for one hour, the powder exhibited a glass transition temperature of 247° C.

In alternative embodiments of the present invention, other halogens, such as F may be substituted for some or all of the Cl groups that are attached to the trifunctional aromatics used in the above examples. As a further alternative OH groups may be substituted for one or two of the halogens. Additionally, rather than the specific sulfone or phosphine trifunctional aromatics that are used in the above examples, other aromatics having electron withdrawing properties can be substituted including, but not limited to other sulfones, other phosphines, carbonyls, sulfoxides, vinyls, ethylidenes, cyano groups, hetero aryls, azo groups and the like. It is most preferable for good reactivity that the halogens are in the ortho or para positions of the rings in relation to the electron withdrawing groups.

Additionally, other halogens, such as F may be substituted for one or both of the Cl that are attached to the difunctional aromatic used in the above examples. As a further alternative, an OH group may be substituted for one of the halogens. Rather than the specific dichlorosulfone described above, any dihalobenzenoid compound or dihydric polynuclear phenol may be employed.

Other compounds can be substituted for the 4,4'-biphenol used as the linking agent in the above examples. A large variety of dihydric polynuclear phenols, preferably dihydroxy aromatic compounds can be used to polymerize the trifunctional aromatics or copolymerize the tri and difunctional aromatics identified above.

In alternative embodiments of the present invention, blends of the proposed curable resins can be made with a variety of thermoplastic resins. Non-comprehensive examples of such thermoplastic resins include polycarbonate, polyetherimides, polyimides, polysulfones, polystyrene, acrylic polymers, etc. The blending can be performed according to blending methods known in the art and the blends can be cured to show glass transition temperature higher than those of the non-blended thermoplastic resins:

EXAMPLE 3

1 g of the curable resin prepared according to example 1 was dissolved in 10 mL NMP. 1 g commercially available polyphenylsulfone (Radel-R 5000, Amoco Performance Products, Inc.) was also dissolved in 10 mL NMP and added to the first solution. Thin films were cast from the mixed solution and dried in vacuum oven at 130° C. overnight. A portion of the film was cured in a tube furnace in air at 400° C. for 60 minutes. The cured blend film showed a glass transition temperature of 254° C., significantly higher than the Tg of pure polyphenylsulfone which was measured to be ~220° C.

In yet another embodiment of the present invention, curable resins can be prepared by reacting a trichlorobenzenoid compound with a double alkali metal salt of an aromatic diol compound. The product of this reaction is surprisingly soluble in various organic solvents. The inference of this observation is that some of the chlorine sites on the trichloro compound have not undergone reaction and thus are available for subsequent post-polymerization reaction. An advantage of the latter approach is that the resin thus produced is not self-curing, however it can subsequently be cured by addition of a small amount of a double alkali metal salt of a diol compound and heating:

EXAMPLE 4

3.72 g (26.85 mmol) potassium carbonate and 5.0 g (26.85 mmol) 4,4'-biphenol were charged into 10 mL of 5:1 NMP:Xylene solvent mixture in a 25 mL round bottom flask fitted with a dean stark assembly and azeotroped for 5 hours. 8.64 (26.85 mmol) 2,4,4'-trichlorodiphenylsulfone were added to the reaction mixture and stirred at about 180° C. for 17 hours. The resulting mixture was dripped into isopropanol. The precipitate was washed with isopropanol twice and dried under vacuum at 130° C. The dried powder was soluble in NMP and showed a glass transition temperature of 198 C. 5 mmol of this resin was solution mixed with 5 mmol potassium salt of 4,4'-biphenol in NMP and dried. Upon heating the mixture at 400° C. in air for 1 hour, the powder exhibited a glass transition temperature of 222° C.

The resins of the present invention are readily employed in the fabrication of composite materials:

EXAMPLE 5

7 g of the resin in Example 1 was dissolved in 50 g 1-methyl-2-pyrrolidinone. The solution was poured onto a 6.5"×7.5" carbon fabric (plain weave Hexcel 282) (6.4 g), placed into a vacuum oven and dried overnight at 130° C. Resin take up was 34.8%. Five 2"×2" pieces were cut from the dried prepreg, stacked on top of each other and compression molded using a heated press at 250° C., 1250 psi for 30 minutes. The molded composite plaque was subsequently cured in air at 371° C. for one hour. The cured plaque showed a DMTA glass transition temperature of 331° C.

EXAMPLE 6

A 5 ply glass fabric (S2 glass fabric 16781, JPS Glass) composite plaque utilizing the resin in Example 1 was fabricated in a similar manner to Example 5. The plaque was cured at 400° C. in air for 1 hour. The cured plaque showed a DMTA glass transition temperature of 289° C.

Additionally, polymeric resin of the present invention of sufficient molecular weight is produced during the polymerization process so as to allow melt processing of the resin using standard melt processing techniques known in the art including compression molding, injection molding, extrusion, calendering, and the like, at temperatures below which significant curing occurs. In one instance, the resin can be for example compression molded at 250° C. and 1500 psi pressure into any shaped article. The article can then be post cured at 350° C. for one hour in a convection oven to impart curing into the article leading to a high use temperature article. In that sense, depending on molecular weight, thermosetting resins of the current invention can be regarded as soluble and workable thermoplastic resins prior to curing at high temperatures. After the high temperature cure operation, the article becomes insoluble and not workable. This workability prior to final cure will have advantages in the cost and process of fabricating articles including molded parts, fiber-reinforced composites, and the like. It will also allow these resins to be utilized as additives with thermoplastic polymers utilizing melt fabrication processes.

The resins of the current invention are also expected to be useful as high temperature coatings. Solutions of these resins of any desired concentration in organic solvents such as dimethylformamide or cyclopentanone can be made and applied to substrates via solution coating techniques known in the art including spraying, doctor-blading, and the like. The solvent is then evaporated and the film exposed to high temperature to induce cure.

In addition to the applications specifically referred to above, other applications for the resins of the present invention include but are not limited to, the blending of one or more resins with one another or with other polymeric material, the use of the resin as an additive, as a free-standing film, fibers formed therefrom, fiber containing composites wherein the resin is used in the matrix, nonwoven fibrous mats, foams, coating compositions, molded articles and articles formed by melt or solution processing of the resin, optionally followed by thermal curing. The resin of the present invention may also be used to increase the use temperature of a polymer composition with the inclusion of the resin therein.

While particular forms of the invention have been described, it will also be apparent to those skilled in the art that various modifications can be made without departing from the spirit and the scope of the invention. Accordingly, it is not intended that the invention be limited except by the appended claims.

What is claimed is:

1. A curable resin comprising a polymer prepared by the polymerization of:
   a sulfonylated or phosphinylated polyfunctional aromatic compound having at least three functional groups, wherein at least one of the functional groups comprises a halogen;
   a dinucleophile;
   optionally a difunctional aromatic compound, wherein at least one of the two functional groups comprises a halogen; and
   optionally a monohalo aromatic endcapper.

2. The resin of claim 1, wherein the polyfunctional aromatic compound is a trifunctional aromatic compound, and the three functional groups comprise halogen.

3. The resin of claim 1, wherein the polyfunctional aromatic compound is a trifunctional aromatic compound, and at least two of the three functional groups comprise halogen.

4. The resin of claim 1, wherein the two functional groups of the difunctional aromatic compound comprise halogen.

5. The resin of claim 1, wherein one of the two functional groups of the difunctional aromatic compound comprises halogen.

6. The resin of claim 1, wherein the dinucleophile is an aromatic diol.

7. The resin of claim 1, wherein the nucleophilic group of the dinucleophile is selected from the group consisting of —OH, —SH, —NRH, and phthalimido, where R is selected from the group consisting of H, alkyl, aryl, alkylketone and arylketone.

8. The resin of claim 1, wherein the halogen of both the polyfunctional and difunctional compounds comprises Cl.

9. The resin of claim 1, wherein the halogen of both the polyfunctional and difunctional compounds comprises F.

10. The resin of claim 1, wherein the polyfunctional and difunctional aromatic compounds have electron withdrawing properties.

11. The resin of claim 1, wherein the polyfunctional and difunctional aromatic compounds independently comprises a sulfone.

12. The resin of claim 11, wherein the polyfunctional aromatic compound comprises 2, 4 ,4'-trichlorodiphenylsulfone.

13. The resin of claim 1, wherein the polyfunctional aromatic compound comprises a phosphine.

14. The resin of claim 13, wherein the phosphine comprises tris(4-chlorophenyl)phosphine oxide.

15. The resin of claim 1, wherein the total number of nucleophilic groups is in molar excess relative to the total number of halogen groups.

16. The resin of claim 15, wherein the molar excess is at least 1%.

17. The resin of claim 15, wherein the molar excess is at least 5%.

18. The resin of claim 15, wherein the molar excess is at least 10%.

19. The resin of claim 1, wherein said polyfunctional aromatic compound having at least three functional groups comprises a sulfone and said difunctional aromatic compound comprises a sulfone.

20. The resin of claim 19, wherein said polyfunctional aromatic compound having at least three functional groups comprises 2,4,4'-trichlorodiphenylsulfone and said difunctional aromatic compound comprises 4-chlorophenyl sulfone.

21. The resin of claim 20, wherein said dinucleophile comprises biphenol.

22. The resin of claim 1, wherein said polyfunctional aromatic compound having at least three functional groups comprises a phosphine and said difunctional aromatic compound comprises a sulfone.

23. The resin of claim 22, wherein said polyfunctional aromatic compound having at least three functional groups comprises tris-(4-chlorophenyl) phosphine oxide and said dihalogenated aromatic compound comprises 4-chlorophenyl sulfone.

24. The resin of claim 23, wherein said dinucleophile comprises biphenol.

25. A high temperature curable resin comprising a polymer prepared by the polymerization of:
   a sulfonylated or phosphinylated polyfunctional aromatic compound having at least three functional groups, wherein at least one of the functional groups comprises a halogen;
   a dinucleophile;
   optionally a difunctional aromatic compound, wherein at least one of the two functional groups comprises a halogen; and
   optionally a monohalo aromatic endcapper.

26. A method of synthesizing a high temperature, curable resin, comprising:
   a) combining a sulfonylated or phosphinylated polyfunctional aromatic, having at least one halogen functional group, with a dinucleophile, a base, and optionally a difunctional aromatic, having at least one halogen functional group, and optionally an aromatic encapper; and
   b) refluxing said combination so as to cause said aromatic to formation of a polymer.

27. The method of claim 26, wherein said dinucleophile comprises an excess of at least 1%.

28. The method of claim 26, wherein said polyfunctional aromatic comprises a trichlorosulfone.

29. The method of claim 28, wherein said trichlorosulfone comprises 2,4,4'-trichlorodiphenyl sulfone.

30. The method of claim 26, wherein said dinucleophile comprises an excess of at least 10%.

31. The method of claim 26, wherein said difunctional aromatic comprises a dichloro aromatic.

32. The method of claim 31, wherein said dichloro aromatic comprises 4-chlorophenyl sulfone.

33. The method of claim 26, wherein said polyfunctional aromatic comprises a trichlorophosphine.

34. The method of claim 33, wherein said trichlorophosphine comprises tris-(4-chlorophenyl) phosphine oxide.

35. The method of claim 34, wherein said difunctional aromatic comprises a dichloro aromatic.

36. The method of claim 35, wherein said dichloro aromatic comprises a sulfone.

37. The method of claim 36, wherein said dichloro aromatic comprises 4-chlorophenyl sulfone.

38. A molded article comprising a curable resin of claim 1.

39. A composite material comprising a curable resin of claim 1.

40. An adhesive comprising a curable resin of claim 1.

41. A coating comprising a curable resin of claim 1.

42. An extruded article comprising a curable resin of claim 1.

43. A coating comprising a curable resin of claim 1.

44. A film comprising a curable resin of claim 1.

45. A blend of polymeric materials comprising a curable resin of claim 1.

46. The blend of polymeric materials of claim 45, wherein one polymeric material is selected from the group consisting of polysulfones, polycarbonates, polyethers, polyetherketones, polythioethers, epoxy polymers, polyimides, polyamides, polyamideimide and polycyanateesters.

* * * * *